May 21, 1929.  R. S. EDWARDS  1,713,868
PROCESS OF TREATING ACIDULOUS BY-PRODUCT CALCIUM SULPHATE
Filed July 18, 1928
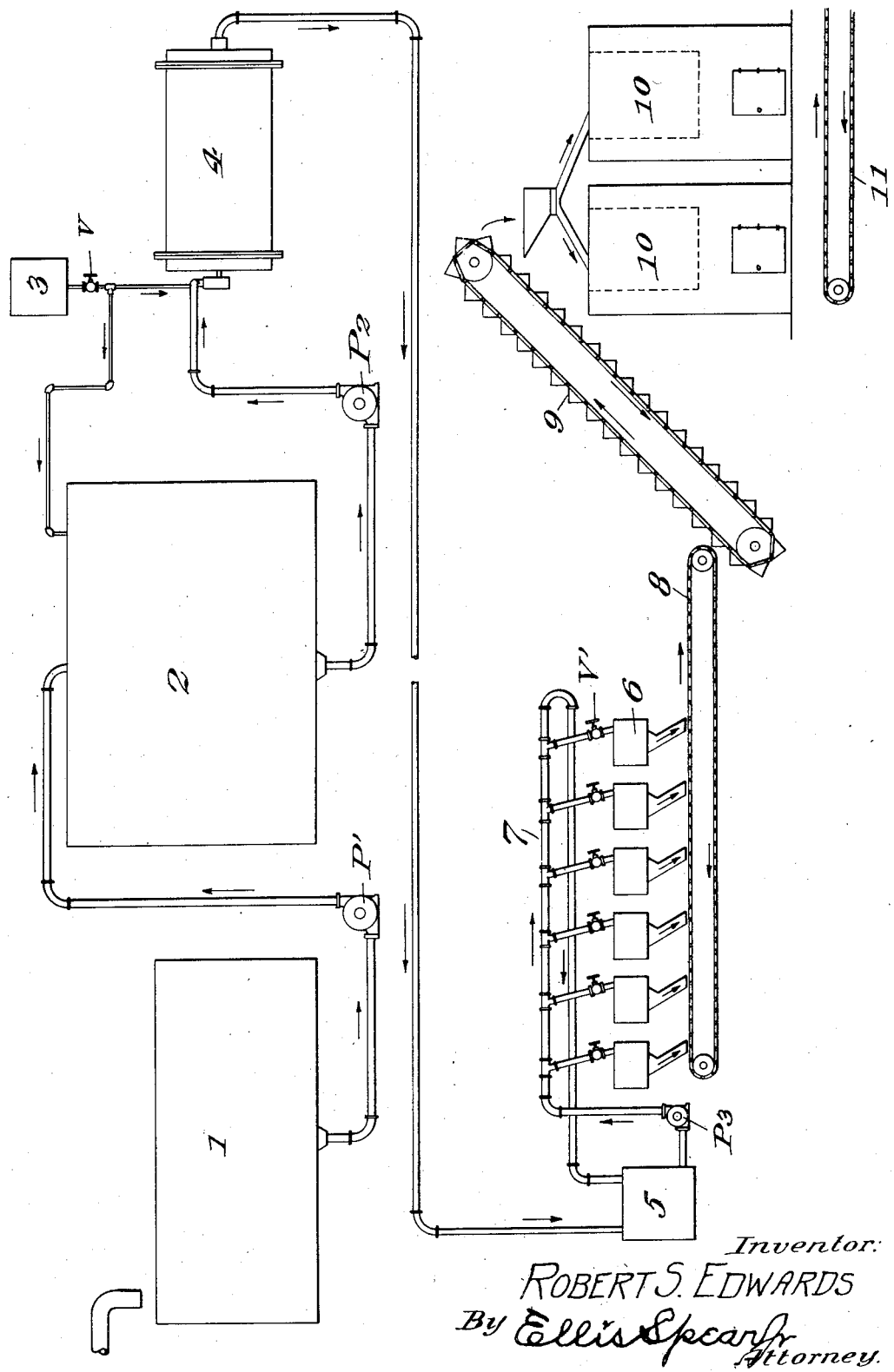
Inventor:
ROBERT S. EDWARDS
By Ellis Spear Jr.
Attorney.

Patented May 21, 1929.

1,713,868

UNITED STATES PATENT OFFICE.

ROBERT SEAVER EDWARDS, OF MILTON, MASSACHUSETTS, ASSIGNOR TO RUMFORD CHEMICAL WORKS, OF PROVIDENCE, RHODE ISLAND, A CORPORATION OF RHODE ISLAND.

PROCESS OF TREATING ACIDULOUS BY-PRODUCT CALCIUM SULPHATE.

Application filed July 18, 1928. Serial No. 293,546.

My present invention relates to the method of producing plaster of Paris from by-product calcium sulphate and has particular reference to the practice of my invention set forth in my previous Letters Patent No. 1,548,358, granted to me August 4, 1925. In that patent I discussed particularly the utilization of the by-product calcium sulphate by steps which produced a highly crystalline and very stable plaster.

In my present invention I contemplate the practice of that method but in a systematized installation of apparatus by the use of which I am able to apply the method with great efficiency and considerable saving in operating costs and attain definite advantages, notably in the neutralizing steps, as well as improvement in the crystal form of the gypsum, which are of great practical value in the commercial practice of my said previous invention.

In discussing my present invention I shall as heretofore make particular reference to the processing of phosphoric acid because while my invention is capable of advantageous practice with other by-product gypsum, the calcium sulphate obtained from the manufacture of phosphoric acid presents certain specific difficulties which do not present themselves in other by-product materials of generally similar nature.

Specifically, as pointed out by me in my prior patent, this is due in the first instance to the persistent nature of the acid remaining in the by-product, and secondly, to its tendency on account of containing small and varying amounts of partially decomposed combinations of phosphate rock, and phosphate rock combined with gypsum occurring in more or less granular form, which upon application of the heat of dehydration of the gypsum cause reversion of these particles into free acid. This tendency towards acid reversion of the semi-extracted phosphate rock particles remaining in the gypsum I have traced to the rather coarse grinding usually practiced in preparing the phosphate rock in the prior process of phosphoric acid manufacture. While the grinding of phosphate rock as practiced by phosphoric acid manufacturers is sufficiently fine to answer all purposes from the liquid phosphoric acid standpoint, there still remains certain varying percentages of coarse material which is not completely decomposed in the acid manufacture and which, of course, are carried over or settle out with the by-product gypsum. These particles although having a surface neutralization, I find have a core which in the state of gypsum, or phosphatic gypsum compounds, is neutral but upon application of heat to hydrate the gypsum becomes acid through reversion.

This phase of my invention I have discussed at length in my copending application Serial No. 182,543, filed April 9, 1927, in which I disclosed a neutralization conducted on a basis of solubility and agitation alone. I have found that my process is improved both as to the perfection of the neutralization in this step and the steps of the process better coordinated by applying this neutralization on a basis of more definite physical contact with the coarser particles of gypsum, or combinations of semi-decomposed phosphate with gypsum, to be neutralized. The acid that is in solution is, of course, readily and immediately neutralized, but as heretofore pointed out, the problem of the coarser particles of calcium sulphate and semi-attacked calcium phosphate having acid reversion tendency on application of heat is more efficiently dealt with by a definite physical treatment, such as blending by attrition grinding, by reason of which the neutralization becomes uniform throughout the gypsum mass with no development of reverted acid in the dehydration by calcination of the gypsum mass so treated.

My present invention, therefore, involves method and an organization of apparatus so combined as to carry on the several steps of the method with the highest efficiency. As a basis of disclosure I have indicated in the accompanying drawing a diagrammatic layout of apparatus which may be considered as indicating the basis of continuous flow of my material as it is processed in accordance with my invention. In these drawings I have merely diagrammatically indicated equipment without attempting to illustrate specific constructions or special types as such apparatus can be varied considerably, and while some features of special design are advantageous in the several parts thereof, I shall make no specific claim to such mechanical details in my present application as those form the subject matter of independent invention relating to such individual apparatus.

Referring now to these drawings as a basis of consideration, I have indicated at 1 a tank which is in practice a thickener tank into which the slurry of the by-product gypsum of the phosphoric acid plant is pumped as through a supply main. This thickener tank is used for the purpose of eliminating the excess water required for pumping the gypsum slurry and serves also to control the consistency of the gypsum slurry so that a uniform pumping rate as through a pump $P^1$ for this gypsum can be supplied at all times for delivery into the agitator storage tank 2.

This agitator storage tank is used for accumulating a large supply of gypsum of uniform consistency and a portion of the neutralizing agent is applied in this agitator storage tank, particularly to neutralize any free phosphoric or sulphuric acid occurring in solution. From this storage tank the gypsum slurry is pumped as by pump $P^2$ in a uniform stream into a tube mill 4 of any standard design, a number of which are on the market. As the uniform charge of gypsum is delivered to the tube mill a definite amount of neutralizing agent is introduced from neutralizer tank 3 during the continuous mechanical operation of the tube mill. The tube mill is charged with different sized steel balls or slugs, pebbles or rods, which serve as the grinding media for bringing the coarser particles of gypsum into intimate physical attritive contact with the neutralizing materials used. The blended discharge coming from this tube mill can be maintained as an absolutely uniform rate of flow and size of particle at all times, and I have found that by maintaining the size of particle discharged from this tube mill so that the blended solid material will pass a 100 mesh sieve, (a sieve having 100 meshes to the linear inch or 10,000 holes per square inch of wires) that the attritive neutralization of the coarser particles has been so complete that future acid reversion of the impurities in the gypsum does not take place.

In practice I find that a flow rate giving about twenty minute retention by continuous tube milling is sufficient to bring about the desired blending results.

I have referred to the tube mill as a convenient apparatus for performing this physical blending step of neutralization, but it will be understood that I may use any other convenient type of mill adapted to wet grinding, as for example, the pug mill, or any other type of wet grinding mill having continuous feed and discharge, and using balls, slugs, pebbles, or rods as the grinding media.

As before stated, the flow from the agitator tank 2 to the blending mill 4 is continuous and the supply of neutralizing material from tank 3 is under absolute control as per valve $V^1$ or by a screw conveyor discharging into the tube mill at a predetermined rate to accommodate the flow from the tank 2. The continuous discharge from the blending mill passes into a small slurry agitator tank 5 which acts as a supply tank for the continuous centrifugal feed 6, as per pump $P^3$. This centrifugal step removes most of the soluble impurities and reduces the free moisture in the gypsum to about 10%, also this centrifugation step densifies the gypsum particles by crystal accretion so that upon discharging the gypsum mass from the centrifugals it is in suitable crystal form for delivery by belt conveyor 8 to elevator 9 to the calcination kettles 10. (See Wilson Patent No. 1,570,583). The mill, therefore, provides for a continuous flow of the material up to the centrifugals which, being arranged in battery so as to be fed from the continuous supply line 7 from the slurry agitator tank 5 as by pump $P^3$, makes the process a continuous one up to the calcining kettles 10 which, being also in battery, provide for a discharge of plaster which can be carried to storage silos or can be connected to direct supply tanks to block making equipment or apparatus for other products which are made from plaster of Paris.

Hitherto it has been the practice to apply heat into the slurry agitator supply tank in order to further complete the neutralization process, as well as to convert the gypsum slurry into a physical condition having less viscosity so that easy flow of this material can be supplied to the centrifugals through the centrifugal supply line 7. I have found by the use of the tube mill that it is a simple and efficient matter to introduce a uniform quantity of steam into the slurry as fed into the tube mill as it is continuously being ground, and, therefore, eliminate the supply of steam to a great extent in the slurry agitator tank. This application of heat to the slurry being ground in the tube mill raises the temperature of the mass and together with the attrition effect of the tube mill action which produces more or less frictional heat which serves to bring the coarse particles into the closest physical contact with the neutralizing agent which results in a thorough and complete neutralization blending of the coarser particles into a uniform and finely divided gypsum magma.

I find in actual practice that applying the neutralization by grinding seems to have an unexpected efficiency over the previous method of applying neutralization in solution and agitation alone. This, I believe, results from the effect of the particles of neutralizer which, as it is fed to the slurry entering the mill, results in an intimate blending effect so that there is an increased attrition of the particles and especially the coarser particles, so that the neutralizer in itself becomes an attrition agent. It is, therefore, of some advantage to have the neutralizing agent of attritive characteristic. While I have referred to the attrition effect of the neutralizer as fed in wet slurry form, this effect may be attained even with the neutralizer fed in dry, if the particles thereof are of a hardness sufficient to give a frictional effect during the grinding or pounding action of the grinding media in the mill.

In considering the physical structure of this by-product gypsum it is well to think under what classification of hardness the mineral gypsum occurs. Natural rock gypsum is a very soft mineral and in the mineral hardness scale it occurs as No. 2, there being only a few minerals softer, such as talc, sodium nitrate, and a few others. By-product or synthetic gypsum secured from the action of sulphuric acid on a lime bearing mineral is precipitated as a solid out of an acid solution. The thoroughness or completeness of the dissolving or solubility action of sulphuric acid on the lime mineral depends on the strength of the sulphuric acid used, the uniform fineness to which the lime bearing mineral has been ground, temperature at which the reaction takes place, and the length of time which the reactants are held in retention through mechanical agitation.

Most of the resultant or residual gypsum from this reaction, however, is exceedingly finely divided due to the dissolving and surface action of the acid on the lime mineral, and from the hardness scale standard this precipitated by-product gypsum is rated as having the same degree of softness as the mineral rock gypsum, with the advantage of having been produced from solution in precipitated form and not permitted to solidify in deposits. While the most of the precipitated by-product gypsum is finely divided there always remains more or less amount of courser gypsum particles and particles of the lime bearing mineral which are but partially decomposed into the soluble extracted acid and precipitated gypsum. These coarser particles which vary in percentage from, say 5% to sometimes as high as 20% and even higher are, comparatively speaking, soft due to the surface absorption action of the liquid acidulous sludge. These particles are coarse because they are of such physical size as to contain at least a dry or semi-dry unattacked core, which in turn invariably contains acid. Also, these particles invariably contain improperly formed gypsum, such gypsum being of a semi-hydrous nature having been incompletely crystallized.

It is for this reason that I have found it very essential to apply my neutralizing treatment to these particles by actual contact, which application is brought about by wet grinding in some form of mill where a continuous force of attrition is applied. There are many basic compounds which can be used for neutralization when actually brought into physical contact with the coarser semi-hydrous gypsum particles through continuous force of attrition, which would be far less active and, in fact, fail to properly neutralize the coarser acidulous particles by simple agitation or stirring in slurry form without the action secured by the force of attrition exerted by the grinding and pounding of the steel slugs or grinding media in any continuous type of wet grinding machine.

One of the improvements brought about by this grinding step in my process I have determined and is explainable as follows. I have found that by-product gypsum secured from phosphoric acid manufacture invariably contains a varying quantity of semi-hydrous gypsum, that is, the gypsum produced has not had sufficient time to become completely hydrated in the phosphoric acid extraction process. I might say that completely hydrated gypsum contains 20.1% water of crystallization when the gypsum is pure, while gypsum from phosphoric acid manufacture is not in all cases thoroughly hydrated but contains anywhere from 5% to 20% of incompletely hydrated gypsum which, of course, has not taken on its full quantity or percentage of water of crystallization and which shows more or less imperfect and irregular crystal growth. I have found that grinding of this semi-hydrous gypsum in contact with water, that this varying amount of semi-hydrous gypsum of imperfect crystal form becomes thoroughly hydrated and that the reaction is hastened in the presence of heat such as raising the temperature of the gypsum slurry ground by application of steam. In fact, a noticeable difference in crystalline form of by-product gypsum ground wet is readily brought about. This is due to the conversion of all of the gypsum mass into a completely hydrous form which is brought about by the frictional pressure of attrition on the gypsum crystals, completing their hydration.

As to the value of wet grinding a by-product semi-hydrous gypsum of imperfect crystalline form, I have definitely proven by laboratory and plant tests that an increased yield or percentage increase of the gypsum so treated is brought about, and furthermore, that this physical action of increasing the water of crystallization content of these semi-hydrous and imperfect gypsum crystals is attained in a short retention period while the wet gypsum mass is passing through the grinding mill in contact with the neutralizing compound used and the grinding media of the mill.

What I therefore claim and desire to secure by Letters Patent is:

1. In the method of producing plaster of Paris from by-product calcium sulphate containing acid, that step which consists in neutralizing by grinding the gypsum slurry with a neutralizing material in the presence of water to anticipate the acid reversion of incompletely attacked calcium phosphate and to complete hydration of the semi-hydrated gypsum particles.

2. In the treatment of by-product gypsum from phosphoric acid manufacture, that step which consists in neutralizing the acid remaining in the gypsum by continuous wet grind blending of the gypsum mass with the neutralizing compound.

3. The method of neutralizing free and combined acidulous particles of varying size remaining in by-product gypsum from phosphoric acid manufacture, consisting in applying a neutralizing compound in the presence of excess moisture and the heat of intimate physical contact attrition.

4. In the treatment of by-product acidulous gypsum having semi-hydrous and imperfectly crystallized gypsum particles of varying size, the step of applying physical abrasion to the gypsum mass in slurry form in the presence of a basic material which is harder than the gypsum so treated.

5. In the treatment of by-product gypsum from phosphoric acid manufacture having more or less semi-hydrous and incompletely crystallized gypsum particles, the step of applying continuous grinding to the gypsum mass in the presence of water and a neutralizing compound until a completely hydrous and blended neutralized gypsum is produced.

6. In the manufacture of by-product gypsum from phosphoric acid manufacture having more or less semi-hydrous and incompletely crystallized gypsum particles, the step of applying continuous grinding to the wet gypsum mass with a calcareous neutralizing material until a completely blended hydrous and neutralized gypsum is produced.

7. The method of increasing the yield of a semi-hydrous acidulous by-product gypsum by continuous wet grinding of the gypsum by attrition contact of a neutralizing compound until complete hydration and neutralization of the gypsum mass takes place.

8. The method of increasing the yield of a wet semi-hydrous acidulous by-product gypsum having coarser particles of varying hardness by attritive neutralization until complete hydration and neutralization of the gypsum mass takes place.

9. In a method of making synthetic plaster of Paris, that step which comprises the development of a non-acid state by chemical reaction physically induced by the attritive application of a neutralizing agent.

In testimony whereof I affix my signature.

ROBERT SEAVER EDWARDS.